Sept. 13, 1949.    D. H. THORNS ET AL    2,482,040
SUPERCHARGED INTERNAL-COMBUSTION ENGINE
Filed Dec. 9, 1942    2 Sheets-Sheet 1
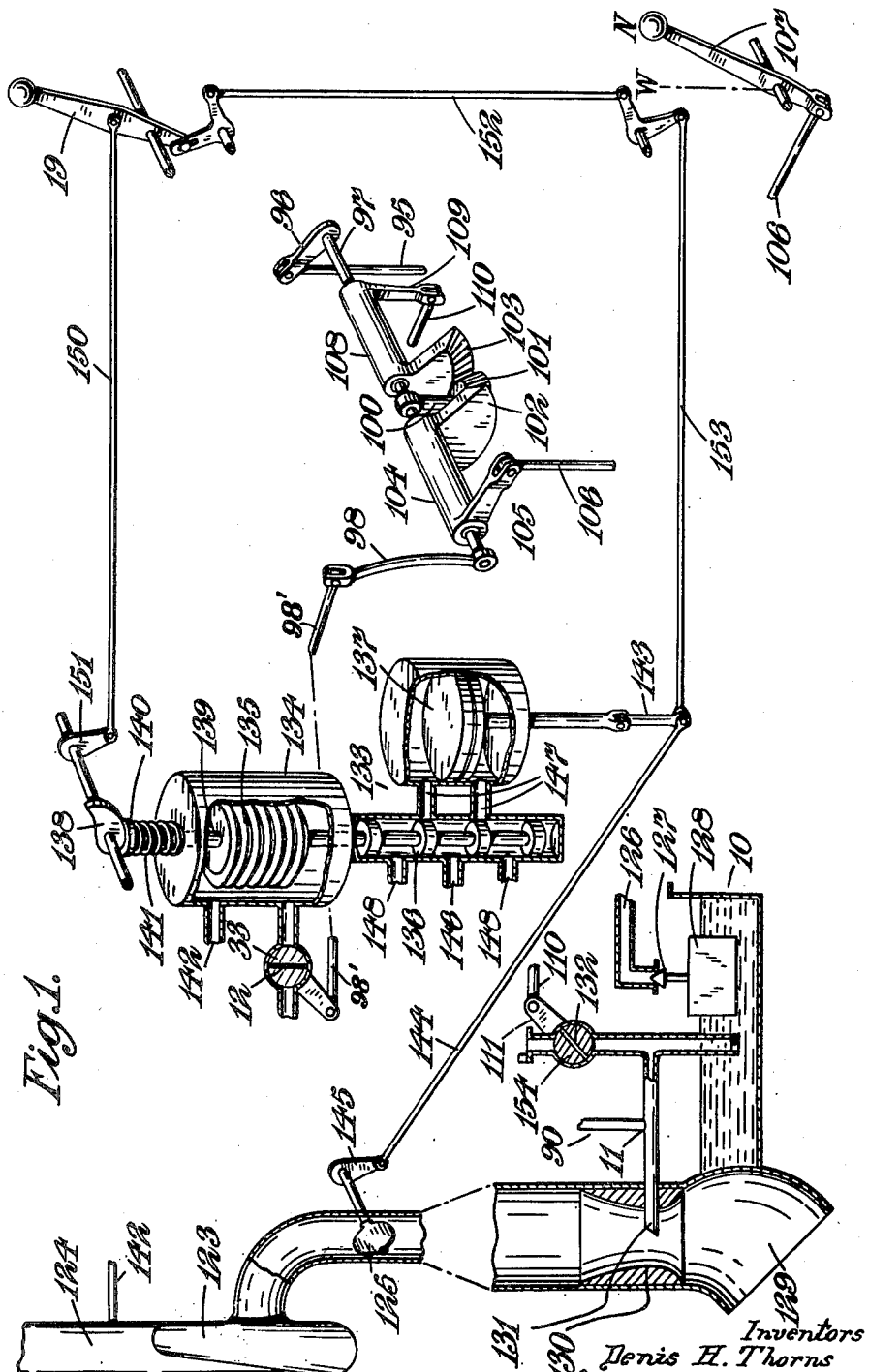
Inventors
Denis H. Thorns
Duncan Ramsay
by Wilkinson & Mawhinney
Attorneys

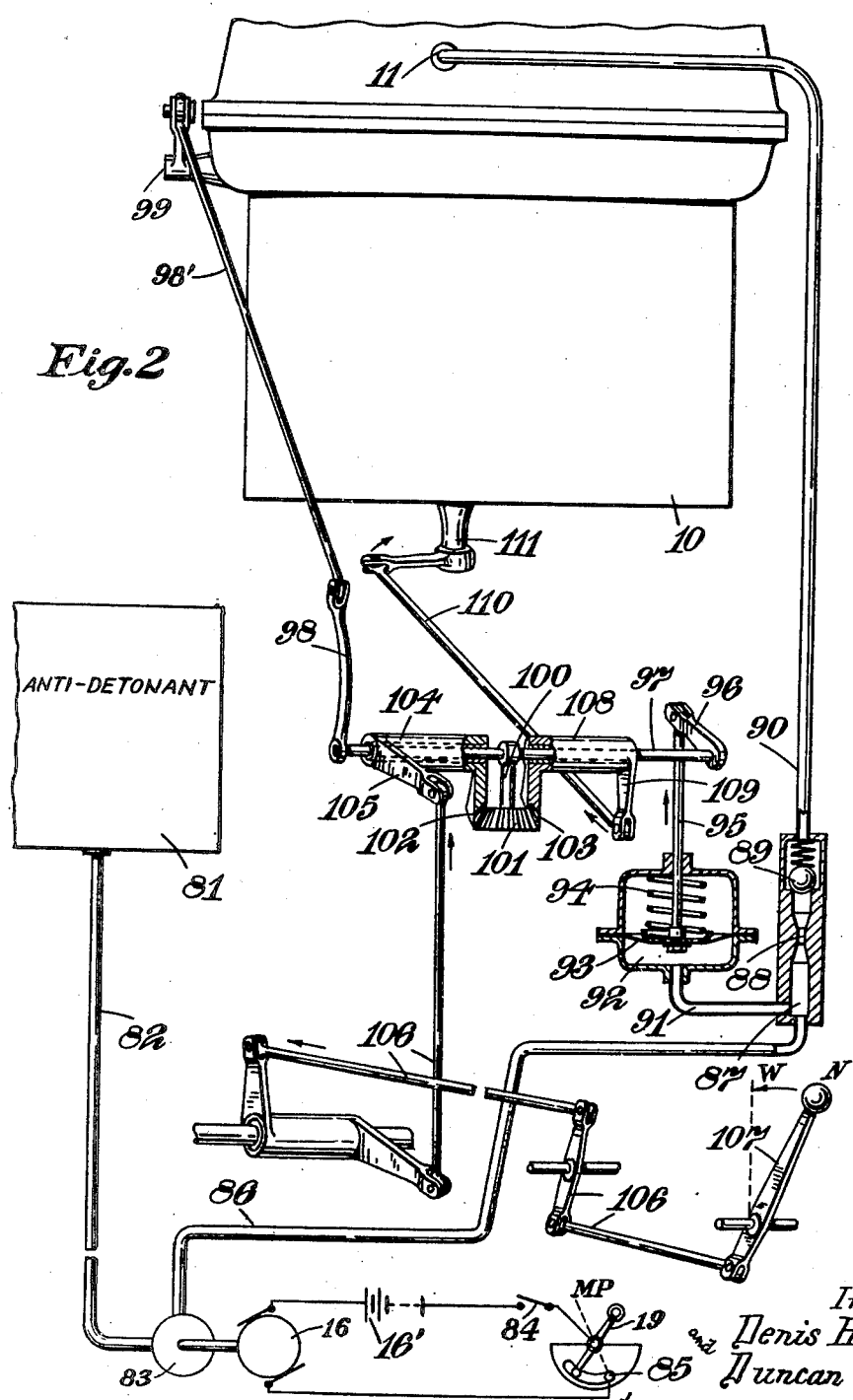

Patented Sept. 13, 1949

2,482,040

UNITED STATES PATENT OFFICE 2,482,040

SUPERCHARGED INTERNAL-COMBUSTION ENGINE

Denis Heaton Thorns and Duncan Ramsay, Bristol, England, assignors to The Bristol Aeroplane Company Limited, Bristol, England, a British company Application December 9, 1942, Serial No. 468,388
In Great Britain October 9, 1941

Section 1, Public Law 690, August 8, 1946
Patent expires October 9, 1961

11 Claims. (Cl. 123—25)

The present invention concerns improvements in or relating to supercharged internal-combustion engines and is of particular advantage for use in connection with aircraft engines although not limited thereto. The invention, however, will be described with reference to aircraft engines.

At the higher pressures of supercharge which are used in such engines (for example during take-off and all-out level flight) there is a tendency to detonation even though additional fuel is passed to the engine to act as an internal cylinder coolant. Supplying an anti-detonant to the engine not only cures this tendency but enables supercharge pressures to be employed therein which are substantially in excess of the maximum pressures permissible without the anti-detonant, and enables a reduction of some 15 to 20% of the normal fuel consumption to be made. Although these advantages may be obtained over the whole range of operation of the engine by the continuous supply of an anti-detonant, nevertheless it is normal to restrict the use of the anti-detonant to periods of short duration when the higher supercharge pressures exist; consequently only a limited supply of anti-detonant is carried in the aircraft. When this limited supply has become exhausted it is essential to ensure that the conditions of excess supercharge pressure and weakened fuel-mixture referred to cannot be brought about.

It is the object of the present invention to provide a simple apparatus for effecting a supply of anti-detonant to an internal combustion engine, and for automatically preventing said excess supercharge pressure and weakened fuel condition from occurring when the anti-detonant has been exhausted.

The invention is illustrated in the accompanying drawings which are purely diagrammatic and not to scale: in these drawings—

Figure 1 is a diagrammatic lay-out of a part of the induction system of a supercharged internal-combustion engine and of an automatic control device for regulating the pressure of supercharge, and Figure 2 is a diagrammatic lay-out of an apparatus constructed in accordance with the present invention and associated with the supercharge control device of Figure 1.

Referring to Figure 1, the supercharger is indicated at 123 and delivers by a pipe 124 to the cylinders of the internal-combustion engine. A throttle-valve 125 is provided which regulates the admission of the induction gases to the supercharger and hence the amount of the supercharge pressure. Associated with the suction side of the supercharger is a carburetter generally indicated by the reference numeral 10, the carburetter receiving fuel from a pipe 126 having an associated needle valve 127 which is operated in known manner by a float 128. Air is drawn into an intake 129 by the supercharger and passes through a venturi 130, thereby creating a pressure reduction in the jet pipe 131. The fuel is therefore drawn from the carburetter into the jet pipe and mixing with the air in the venturi, passes towards the inlet of the supercharger.

With a view to varying the datum setting of the fuel-air mixture, a valve 154 is provided, the valve having a calibrated orifice 132 which is capable of placing the jet pipe 131 in communication with the atmosphere. When this is done by adjustment of arm 111 the suction head of the venturi is diminished and as a consequence less fuel is drawn from the carburetter into the pipe 131. The fuel-air mixture is therefore weakened. When the valve 154 is in the position shown in Figure 1 the suction effect on the jet pipe 131 is fully effective and the fuel to air mixture is therefore considered to be normal. Valve 154 is adjusted to the normal or weak fuel-mixture setting by lever 107 which is connected with arm 111 by links 110, 109, 105 and 106 as hereinafter explained. When lever 107 assumes the position indicated at N valve 154 assumes the position for normal fuel-air mixture and when at W valve 154 assumes the position for weak fuel-air mixture.

Associated with the supercharger 123 is known form of control for automatically regulating the pressure of supercharge. The control is generally indicated by the reference numeral 133 and comprises a chamber 134, a capsule-stack 135 mounted therein, a valve 136 carried by the stack of capsules, a hydraulic motor 137, the pressure fluid to which is regulated by the valve 136 and a cam 138 which engages with a rod 139 secured to the upper end of the stack of capsules. The rod 139 is formed with a collar 140 between which and the chamber 134 is placed a compression spring 141. The chamber 134 communicates with the delivery side of the supercharger 123 by a pipe 142 so that the pressure of supercharge is communicated to the stack of capsules 135. Accordingly with variations in the pressure of supercharge the stack of capsules 135 will expand or contract, thereby adjusting the valve 136 and permitting pressure fluid to pass to the hydraulic motor 137 so that the latter will adjust the valve 125 through linkage 143, 144 and 145. Pressure fluid is delivered to valve 136 by pipe 146 and is capable of passing to the motor 137 by passages 147, the exhaust fluid from the motor being discharged from pipes 148.

The cam 138 and the throttle valve 125 are each simultaneously capable of adjustment by the throttle-lever 19.

The operation of the supercharger control described above is as follows: When the pilot adjusts the throttle-lever 19 to select a particular power output from the internal-combustion engine, he simultaneously adjusts the cam 138 by linkage 150, 151 and the throttle valve 125 through linkage 152, 153, 144, 145. When the throttle-valve 125 is thus adjusted the quantity of combustion mixture which passes to the supercharger 123 is varied and as a result the pressure of supercharge and the power output of the internal-combustion engine are correspondingly varied. When the cam 138 is thus adjusted, rod 139, the capsule stack 135 and valve 136 are moved axially as a unit so that valve 136 is opened. However, when the newly established pressure of supercharge is transmitted by pipe 142 to the stack of capsules 135, valve 136 is readjusted and moved to the closed position when the pressure of supercharge has the correct value selected by adjustment of lever 19. The datum value of the supercharge pressure is determined by the cam 138 which is adjusted by the pilot for each power output selected. In the event that the pressure of supercharge departs from the value selected by the pilot, the automatic control device is brought into operation as described to adjust the throttle-valve 125 and reestablish the pressure of supercharge at the selected datum value.

Under certain circumstances it is desirable to obtain excess power output from the engine and for this purpose there is provided a valve diagrammatically illustrated at 33 which is capable of placing the chamber 134 in communication with the atmosphere by a calibrated orifice 12. When this is done the pressure of supercharge within the chamber 134 is reduced and as a result the stack of capsules 137 will expand, thereby moving the valve 133 to bring the motor 137 into operation to adjust the throttle-valve 125 and move it towards the open position. The pressure of supercharge and the power output of the engine are therefore increased. The valves 33 and 154 are operated in a manner hereinafter described.

The arms 98 and 109 which are respectively connected to valves 33 and 154 form a part of a mechanism which is shown more fully in Figure 2. There is associated with this mechanism a tank 81 having a supply of anti-detonant which under certain circumstances is to be passed to the carburetter 10 by a pipe 90 which communicates with the jet pipe 131 at 11 (Figure 1). The anti-detonant passes from the tank 81 by a pipe 82 to an electrically driven centrifugal pump 83 which is situated at a lower level than the tank 81 so that if any liquid is present the pump is submerged and generates a delivery pressure when operated but if no liquid is present no pressure is generated even when the pump is set in operation.

The electric motor 16 driving the pump 83 is supplied from a battery 16' under the control of a master-switch 84 and a throttle-lever controlled switch 85. This throttle-lever controlled switch may be so arranged that it is closed when the lever 19 is moved beyond its normal working range to a maximum supercharge pressure position MP which is used only for take off, all out level speed or some such special condition. It will be appreciated that the switch 85 is not necessarily mounted on the throttle-lever 19 itself but may be connected to it or may be controlled by any member which moves with the throttle-lever.

The delivery from the centrifugal pump 83 of the anti-detonant under suitable pressure is taken by the pipe-connection 86 to a chamber 87 from whence it passes by a metering-jet 88, non-return ball-valve 89 and pipe-connection 90 to the inlet 11 connected with the fuel inlet 12 of the induction system of the engine.

From the chamber 87 a branch-pipe 91 admits the anti-detonant to a chamber 92 having a flexible diaphragm 93 forming a wall thereof; this diaphragm may be loaded by a spring 94. The diaphragm is pivotally connected by a spindle 95 to an arm 96 on a rocking-shaft 97, and on the other end of this shaft there is secured an arm 98 which is connected by a link 98' to the rotatable valve 33 to open it when the shaft is rocked. The spindle of valve 33 is indicated at 99.

The shaft 97 also carries fast upon it an arm or shaft 100 whereon is mounted a bevel-planet-pinion 101 which meshes with two bevel-gears or segmental racks 102, 103, respectively, as shown in Figure 1. No claim is made to the construction of these racks per se as any well known construction allowing the limited range of movement required would suffice. For instance two bevel wheels facing one another and coupled by a bevel pinion 101 would answer the purpose. However, because of the limited range of movement required complete bevel wheels are not used and the segments 102 and 103 have been described as segmental racks. The bevel-gear segment 102 is carried on a sleeve 104 which is free to rotate on the shaft 97 and this sleeve carries a radial arm 105 which is connected by a suitable linkage 106 with the pilot's fuel-mixture-control-lever 107. This lever as described above is movable between two positions for normal mixture and weak mixture, respectively.

The bevel-gear segment 103 is carried on a sleeve 108 free to rotate on the shaft 97 and carrying an arm 109 which is connected by a link 110 to the fuel-mixture-control valve 154 at 111.

Under normal conditions, when there is no demand for anti-detonant, the spring 94 acting on the diaphragm 93 maintains the shaft 97 in one of its two limiting positions in which the bleed-valve 33 is closed. If the pilot operates his fuel-mixture-control-lever 107 it rocks the sleeve 104 through the linkage 106, and the gear segment 102 drives through the planet-pinion 101 the gear segment 103 to rock the sleeve 108. This drive is transmitted because the shaft 100 of the planet-pinion 101 is held stationary by the shaft 97. The movement of the sleeve 108 is transmitted to the mixture-control-valve 154 in accordance with the pilot's requirements. When maximum supercharge pressure is required, the throttle-lever is moved to its limiting position which closes the switch 85 and starts the electric motor to drive the pump 83 so that anti-detonant, if available from the tank 81, is delivered under pressure to the chamber 87. Some of it passes thence through pipe 90 to the inlet 11 to the induction system, and the pressure is also applied to the diaphragm 93, the movement of which rocks the shaft 97 and opens valve 33 by adjustment of rods 98 and 98'. The fuel-mixture-control-lever 107 will ordinarily be in its "normal" position N and is firmly held so that the bevel-gear segment 102 is maintained stationary and the planet-pinion 101 rolling on it transmits a drive to the bevel-gear segment 103. This rotates the sleeve 108 and through the link 110 adjusts the fuel-mixture-control-valve 154 to the "weak mixture" setting.

If there is no supply of anti-detonant available, no pressure is delivered by the pump 83, or if during higher boost pressures during the operation of the engine the supply of anti-detonant becomes exhausted, the pressure on the diaphragm 93 falls off and all the parts return to their normal setting.

In the foregoing description reference has been made to anti-detonants generally and for this purpose there may be used water, or a mixture of water and alcohol or a mixture of methanol and water, but it is to be understood that the invention is not restricted to the use of these anti-detonants.

We claim:

1. In a supercharged internal-combustion engine, the combination of manually-adjusted means controlling the power output of the engine, means operated by the adjustment thereof to a predetermined setting to effect a supply of anti-detonant to the engine, means operated by the pressure of the anti-detonant supply to effect an increase in the boost-pressure beyond the normal value, means operable by the pilot to weaken the fuel-mixture, and means operable by the pressure of the anti-detonant supply to automatically weaken the fuel-mixture.

2. In a supercharged internal-combustion engine, the combination of an automatic boost-control device controlling the power-output of the engine, means for adjusting said boost-control device, means operable on a predetermined setting of the said adjusting means to override said automatic boost-controlling device, means operated by such setting to effect a supply of anti-detonant to the engine and means also operated by said setting to weaken the fuel-mixture.

3. In a supercharged internal-combustion engine, the combination of manually-adjustable means controlling the power output of the engine, a chamber subjected to the boost-pressure of the engine, a flexible capsule in said chamber operatively connected with boost-controlling means, a bleed-valve from said boost-control-capsule-chamber, means for supplying anti-detonant under pressure to the engine, a flexible diaphragm subjected to the pressure of the anti-detonant supply, a rocking-shaft connected to said diaphragm to be rocked thereby, an operative connection from said rocking-shaft to said bleed-valve, a manually-operable mixture-control-lever, a mixture-control-valve, differential gearing connecting said lever and said valve, a connection from said rocking-shaft to said gearing whereby movement of said shaft also operates said mixture-control-valve.

4. In a supercharged internal-combustion engine, the combination of a lever controlling the power output of the engine, an electric switch operable at a predetermined setting of said lever, an electric motor controlled thereby, a pump driven by said motor to deliver anti-detonant to the engine, a chamber in communication with the delivery pipe of said pump, a flexible diaphragm in said chamber, a connection from said diaphragm to a rocking-shaft, a radial arm on said rocking-shaft, a bevel-pinion on said arm, a first bevel-wheel engaged by said pinion, a sleeve on said wheel, an operative connection from said sleeve to a manually-adjustable mixture-control-lever, a second bevel-wheel engaged by said pinion, a sleeve on said second bevel-wheel operatively connected to a mixture-control-valve, and an operative connection from said rocking-shaft to an automatic boost-control device.

5. In a supercharged internal-combustion engine, the combination with means operable on a predetermined setting of a lever controlling the power output of the engine, to supply anti-detonant under pressure to the engine, a flexible diaphragm subjected to said pressure, a connection from said diaphragm to a rocking-shaft, two sleeves rotatable on said shaft, a sun-wheel on each of said sleeves, a planet-wheel carried by said rocking-shaft engaging said sun-wheels, an operative conection from one sleeve to a mixture-control-valve, an operative connection from the other sleeve to a manually-operable mixture-control-lever, and an operative connection from said rocking-shaft to an automatic boost-control device.

6. In a supercharged internal combustion engine, the combination of means for controlling the power output of the engine, electric means operable at a predetermined setting of said first means, an electric motor controlled thereby, a pump driven by said motor to deliver anti-detonant to the engine, a chamber in communication with the delivery pipe of said pump, a flexible diaphragm in said chamber, a connection from said diaphragm to a rocking shaft, a radial arm on said rocking shaft, a bevel-pinion on said arm, a sleeve on said wheel, an operative connection from said sleeve to a manually adjustable mixture control lever, a second bevel wheel engaged by said pinion, a sleeve on said second bevel-wheel operatively connected to a mixture control valve, and an operative connection from said rocking shaft to an automatic boost-control device.

7. The method of preventing detonation in an internal combustion engine normally supplied with power fuel such as gasoline delivered to the engine manifold under supercharger pressure, which comprises delivering supplementary anti-knock fuel such as alcohol and water under control of the engine manifold pressure for mixture with the power fuel, during such delivery of supplementary fuel automatically reducing the delivery of power fuel by a volume to be replaced by the supplementary fuel to produce a mixture which will eliminate engine knocking during a period of manifold pressure under which knocking would otherwise occur, and automatically preventing such reduction in power fuel delivery in the event of supplementary fuel flow failure.

8. A method of preventing detonation in an internal combustion engine which is supplied with a power fuel under supercharged pressure which comprises delivering supplementary anti-knock fuel, such as alcohol and water, at a predetermined engine manifold pressure for mixture with the power fuel, during such delivery of the supplementary fuel automatically reducing the delivery of power fuel by a volume to be replaced by the supplementary fuel, to produce a mixture which will eliminate engine knocking during a period of manifold pressure under which knocking would otherwise occur, and automatically preventing such reduction in power fuel delivery in the event of supplementary fuel flow failure.

9. In a control system for an aircraft engine, adjustable means effective to limit the maximum quantity of air and fuel supplied to said engine, means for supplying a combustion modifying liquid ingredient to said engine, and means responsive to variations in a flow condition of said ingredient for adjusting said adjustable means.

10. A charge forming apparatus comprising adjustable means to limit the rate of flow of charging air, means to regulate the rate of flow of charging fuel in predetermined relation to the rate of flow of charging air, adjustable means to vary the ratio of fuel to air in the fuel-air charge, means for adding a predetermined amount of a combustion modifying ingredient to said fuel-air charge, and means automatically effective when said ingredient is added to change the adjustment of both said air flow limiting means and said fuel-air ratio varying means.

11. In a water injection apparatus for a supercharged engine having an adjustable supercharger control device and an adjustable fuel-air ratio control device, means for feeding water to said engine, and means operatively associated with said water feeding means for adjusting at least one of said control devices.

DENIS HEATON THORNS.
DUNCAN RAMSAY.

REFERENCES CITED

The following references are of record in the file of this patent:

UNITED STATES PATENTS

| Number | Name | Date |
|---|---|---|
| 1,758,897 | Evans | May 13, 1930 |
| 2,002,483 | Kimball | May 21, 1935 |
| 2,221,405 | Nallinger | Nov. 12, 1940 |
| 2,252,415 | Schwarz | Aug. 12, 1941 |
| 2,295,656 | Hersey et al. | Sept. 15, 1942 |

FOREIGN PATENTS

| Number | Country | Date |
|---|---|---|
| 499,741 | Great Britain | 1939 |